US006856662B2

(12) United States Patent
Glass et al.

(10) Patent No.: US 6,856,662 B2
(45) Date of Patent: Feb. 15, 2005

(54) REMOTE EXAMINATION OF REACTOR NOZZLE J-GROOVE WELDS

(75) Inventors: Samuel W. Glass, Lynchburg, VA (US); Elton Crisman, Concord, NC (US)

(73) Assignee: Framatome ANP, Inc., Lynchburg, VA (US)

(*) Notice: Subject to any disclaimer, the term of this patent is extended or adjusted under 35 U.S.C. 154(b) by 0 days.

(21) Appl. No.: 10/437,156

(22) Filed: May 13, 2003

(65) Prior Publication Data

US 2004/0228432 A1 Nov. 18, 2004

(51) Int. Cl.[7] .............................................. G21C 17/00
(52) U.S. Cl. ........................... 376/249; 376/247; 374/5
(58) Field of Search ................................ 376/249, 247; 374/5

(56) References Cited

U.S. PATENT DOCUMENTS

| | | | | |
|---|---|---|---|---|
| 4,854,724 A | * | 8/1989 | Adams et al. ................... | 374/5 |
| 5,327,079 A | * | 7/1994 | Haller et al. .................. | 376/249 |
| 5,388,129 A | * | 2/1995 | Hartley ......................... | 376/249 |
| 5,396,800 A | * | 3/1995 | Drinon et al. ................ | 376/249 |
| 5,460,045 A | * | 10/1995 | Clark et al. ................... | 376/249 |
| 6,000,844 A | * | 12/1999 | Cramer et al. ................ | 374/5 |
| 6,329,635 B1 | * | 12/2001 | Leong et al. ................ | 219/121.83 |

FOREIGN PATENT DOCUMENTS

| | | | | |
|---|---|---|---|---|
| DE | 2636246 | * | 2/1978 | ................ 376/249 |

* cited by examiner

Primary Examiner—Harvey E. Behrend
(74) Attorney, Agent, or Firm—Vytas R. Matas

(57) ABSTRACT

A combined laser and infra red sensing camera is located beneath the reactor head in the vicinity of the closure head tube welds by manipulating known robotic device handling the laser which is used to heat a line along the surface thereby generating a thermal wave that propagates over the one to two square inch test area where the increased thermal resistance of cracks and anomalies makes the surface temperature profile gradient greater at a crack or anomaly. An IR camera captures the test area image of interest as the thermal wave propagates across the target inspection area and the image is processed and enhanced to show cracks and other anomalies as a sharp drop in the thermal scan at the point of the crack using known Photo Thermal NDE technology to convert the scan into a pictorial representation of the scanned surface clearly showing any cracks therein. This process is repeated sequentially until the entire circumference of the weld is scanned.

6 Claims, 5 Drawing Sheets

PICTORIAL VIEW

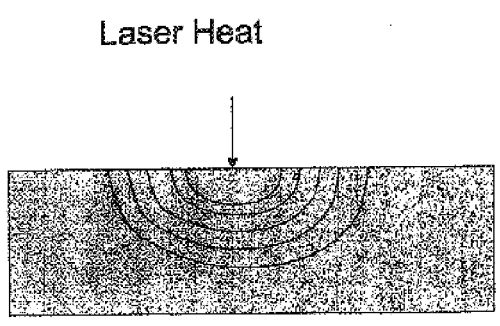
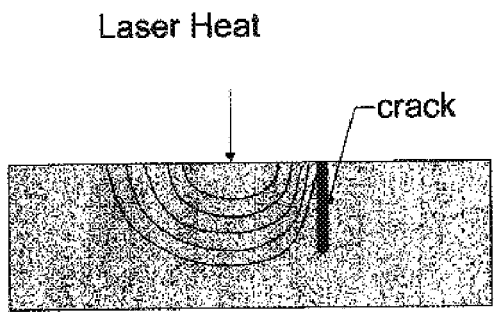
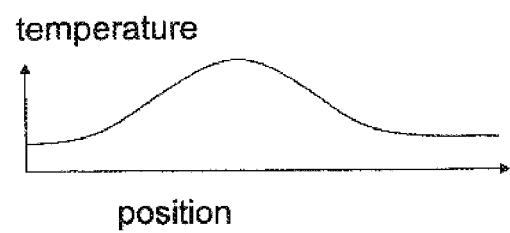
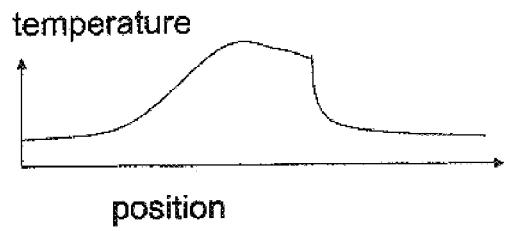
FIG. 7
FIG. 8

REMOTE EXAMINATION OF REACTOR NOZZLE J-GROOVE WELDS

BACKGROUND OF THE INVENTION

1. Field of the Invention

The present invention generally relates to photothermal inspection of surface welds and more particularly to remote phtothermal inspection of welds in reactor elements such as control rod nozzles.

2. Description of the Prior Art

Nuclear reactors have a reactor cover or closure head through which a series of openings having tubes extending into the inside surface of the reactor are welded to the closure head by J-groove welds. These tubes have control rod drives (CRD) and instrumentation packages sealably extending into the reactor internals. These J-groove welds must be inspected during reactor shut down for any cracks that may have developed in the welds. Such inspections must be made from beneath the reactor head with the head on a supporting head-stand during normal refueling periods. Standard nondestructive examination techniques such as eddy current and die-penetrant examinations are currently the normal inspection approach. Since the high radiation in the reactor prevents personnel from entering the reactor to perform such testing, various robotic elements are used to remotely access these welds with the mentioned nondestructive testing machinery. The known testing equipment require a close proximity or actual contact to the tested weld surface which is difficult to achieve with the robotic delivery devices and the remotely controlled tools used to access the welds.

Thus some form of nondestructive remote testing of these welds was needed which did not require close proximity or contact with the welded surface and the exact robotic manipulation associated therewith which is difficult to implement.

Generally photothermal weld testing is known and is described in various patents. As an example, U.S. Pat. No. 4,854,724 teaches the use of a non destructive examination (NDE) technique using IR thermography to determine weld integrity by detecting infrared radiation emitted from the weld 1T surface which has be en preheated by a heat source. The application is to determine weld integrity in aircraft and does not recognize the problems associated with checking nuclear reactor welds with internally located robotics.

U.S. Pat. No. 6,000,844 teaches a remote portable NDE technique for determining the integrity of a material surface using a moving heat source and an I-R camera to produce a thermal image of the surface that shows defects as surface temperature deviations but again fails to recognize checking nuclear reactor internal welds using robotics.

U.S. Pat. No. 6,329,635 teaches a laser welding monitoring technique using IR emission. The patent shows that it is known to use laser heat sources in combination with IR thermographic imaging techniques but fails to teach any nuclear reactor weld checking techniques inside the reactor.

SUMMARY OF THE INVENTION

A combined laser and infa red sensing camera is located beneath the reactor head in the vicinity of the closure head tube welds by manipulating known robotic devices holding same. The laser and camera are merely aimed at the weld from a location remote there from and require no delicate aiming. The laser is used to heat a predetermined weld area with a laser plane of light. The IR camera then moves over the predetermined area to scan the temperature of the area of interest as the thermal wave propagates across the target inspection area. At cracks or other anomalies, the thermal wave does not propagate as rapidly through the crack thereby producing a detectable indication of the anomaly as a shard drop in the thermal scan at the point of the crack. Using known Photo Thermal NDE technology, the scan is converted into a pictorial representation of the scanned surface clearly showing any cracks therein. This process is repeated sequentially until the entire circumference of the weld is scanned.

This method is applied substantially remotely from the weld target. This minimizes the difficulties of addressing the weld with complex robotics using known methods requiring close proximity or contact and allows the camera and laser to simply be aimed at the region of interest from a location well outside the CRD nozzle and Thermal Sleeve forest.

In view of the foregoing it will be seen that one aspect of the present invention is to provide a remotely located photothermal inspection of a reactor weld.

Another aspect is to provide a reactor weld inspection from inside the reactor using robotically positioned and controlled photothermal apparatus.

Still another aspect is to provide an easily understood infrared display of any defects in the inspected weld.

These and other aspects of the present invention will be more fully understood upon review of the following description of the preferred environment when considered along with the accompanying drawings.

BRIEF DESCRIPTION OF THE DRAWINGS

In the drawings wherein:

FIG. 7 depicts a laser heated weld and the temperature sensed along the weld in a good weld; and FIG. 8 depicts a laser heat weld with a crack therein and the temperature scanned along the weld showing a dip at the crack.

DESCRIPTION OF THE PREFERRED EMBODIMENT

Figure 1:
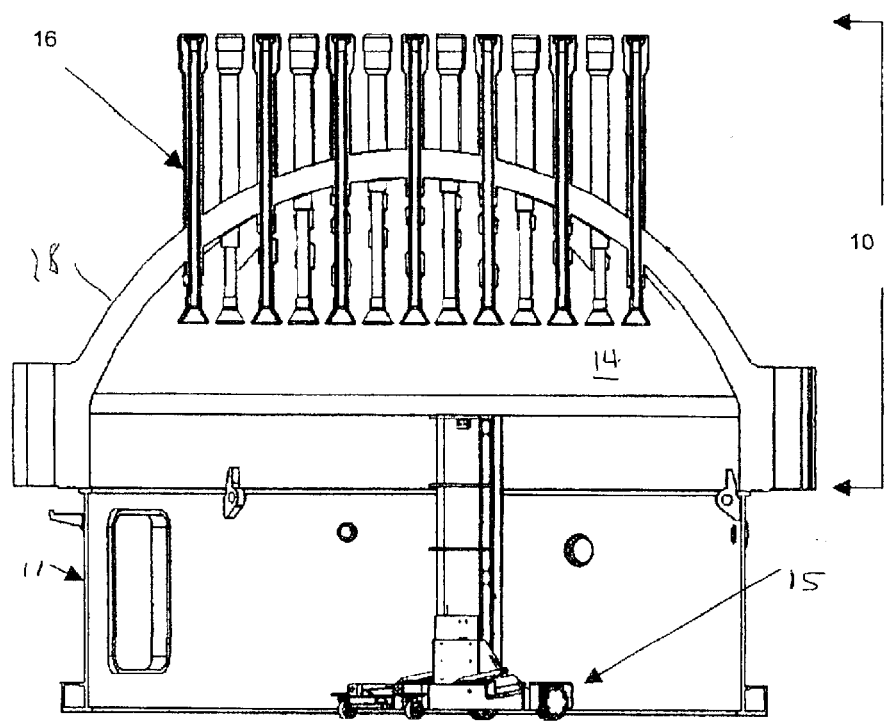
FIG. 1 is a cut away side view of a nuclear reactor showing the closure head through which welded pipes extend into the reactor.
Figure 2:
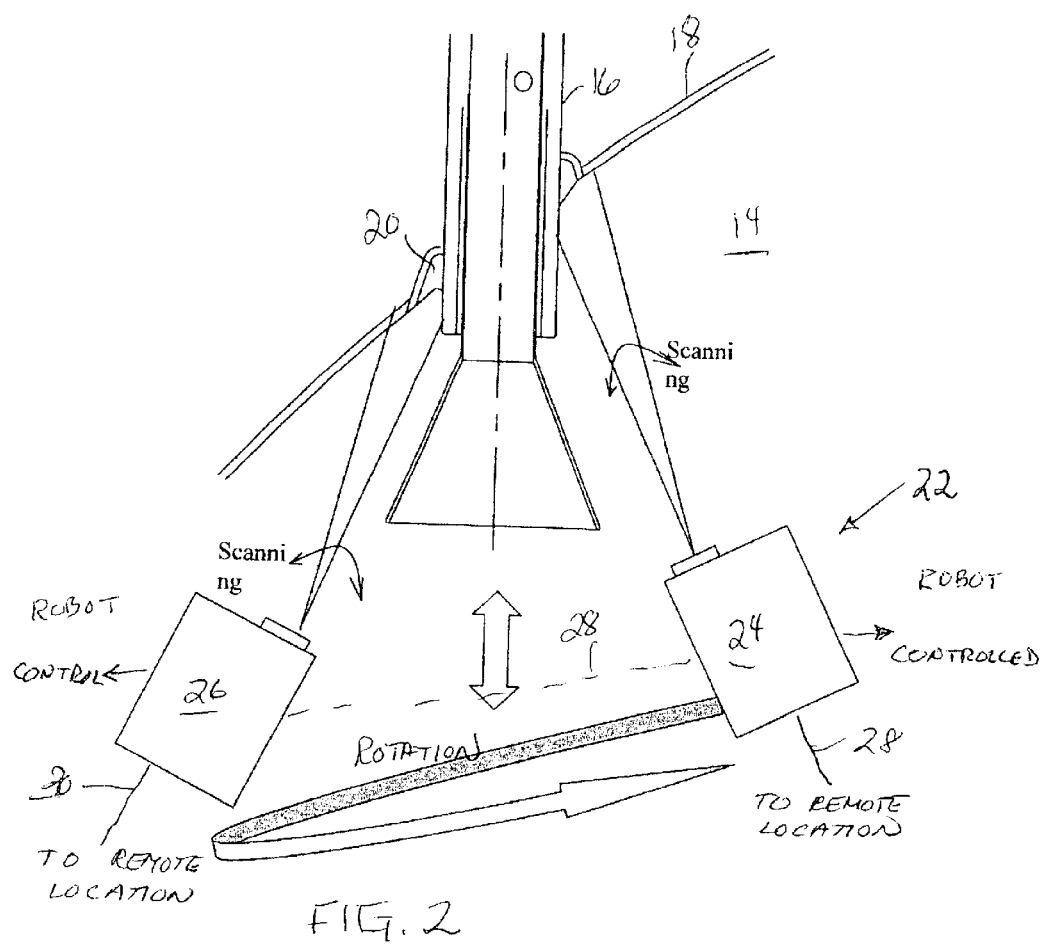
FIG. 2 is an expanded view of one of the pipes extending through the closure head of the FIG. 1 reactor with the laser and photothermal mechanisms of the present invention shown remotely checking the J-groove welded bead around the pipe.

Referring now to the drawings, FIGS. 1 and 2 show a known nuclear reactor head assembly (10) on its refuel parking stand (11) having a series of Inconnel 600 control rod drive tubes (16) extending through the dome (14) of the reactor head (10). The carbon steel dome is clad with approximately 0.5 in. of stainless steel (18). The tubes are welded to the clad head (10) by a known J-groove weld (20).

Under some conditions, the J-groove welds must be 100% inspected for flaws during reactor refuel and maintenance outages. This testing is done from beneath (14) the reactor head (10) by known robotics such as the ARAMIS or ROCKY robot (15) connected to testing assembly (22) which rotates the assembly (22) around the J-groove weld (20) from a location remotely spaced there from but sill offering a view of the weld (20).

Figure 3:
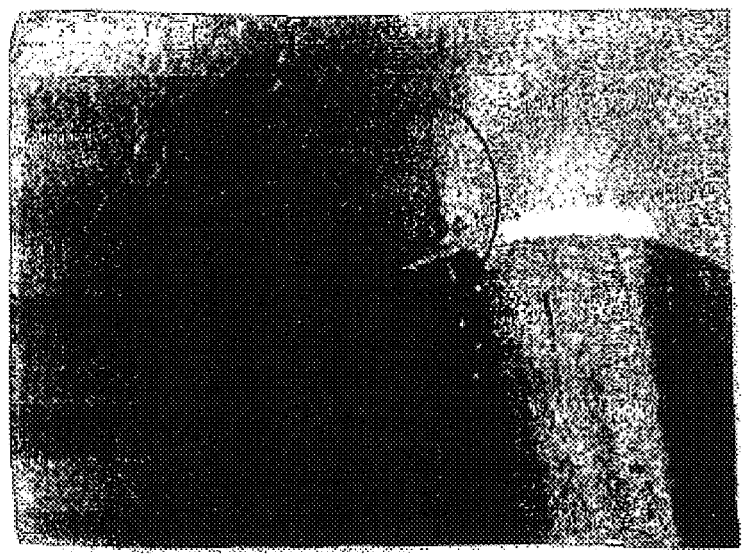
FIG. 3 is a photothermal image of a radial crack detected by the FIG. 2 photo imaging mechanisms.

The weld detection assembly (22) is comprised of a laser (24) which is aimed at a predetermined area of the weld (20) from a distance of around 0.5 to 1.5 meters and heats the weld with a focused plane of light emanating at an intensity of up to 100 watts and an infrared (IR) camera (26) also aimed at the weld (20) from approximately the same distance as the laser to provide an infrared pictorial view of the heated weld (20). The IR camera is a known camera available from FLIR. Both the laser (24) and IR camera are connected together by a link (28) and are remotely positioned to rotate as a unit sequentially around the circumference of the weld in predetermined area intervals of approximately two inches until the entire circumference is scanned for defects through the known robotics. The laser is first moved to the predetermined area to heat same for a time period of approximately one second and then the scan by the IR camera follows to provide the infrared temperature scan showing any sharp drops in the scan as a crack defect. This signal is then converted to a visual display as seen in FIG. 3 by the IR camera in a known manner. Signal inputs and outputs from the laser (24) and IR camera (26) are feed along lines (28, 30) respectively to the same remote location (not shown) controlling the robotics. Because thermal imaging is forgiving of focal distance and view angle, full coverage of the weld can be obtained without complex surface tracking.

Figure 4:
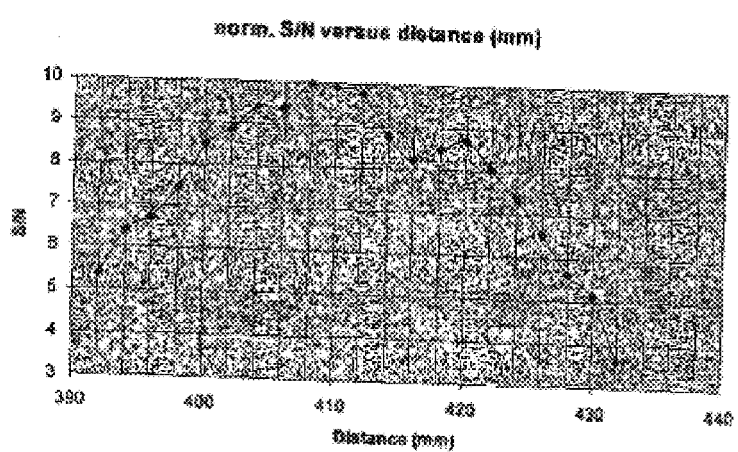
FIG. 4 is a graph of the signal to noise ratio from a test of a 30 u fatigue weld crack viewed at various distances.
Figure 5:
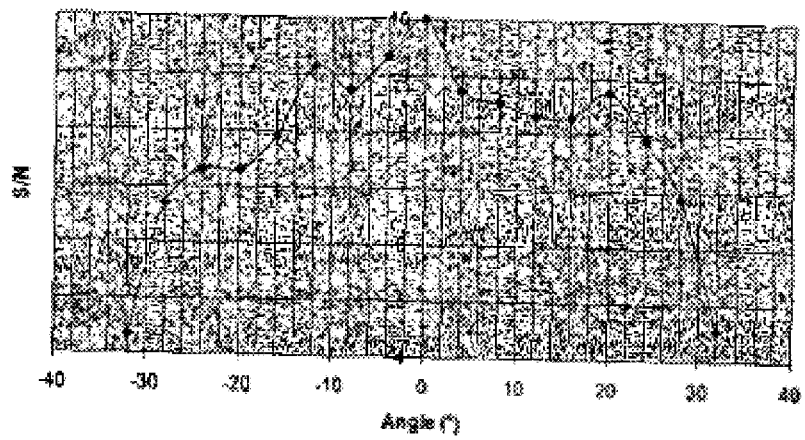
FIG. 5 is a graph of the signal to noise ratios for differing viewing angles for the FIG. 4 crack.
Figure 6:
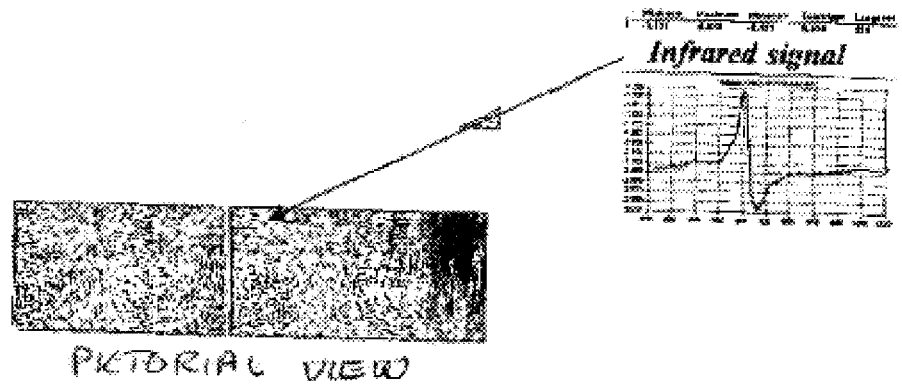
FIG. 6 is a depiction of a thermal crack as visually displayed from an accompanying infrared signal scan showing the discontinuity at the crack.

Referring to FIGS. 4-5 which show this relative independence of distance and angle of view from the weld, a graph of signal to noise ratio was prepared on a $30\mu$ fatigue weld crack bar sample for both distance and view angle. These graphs may be used to position the assembly at the optimum distance and angle from the weld. As is best seen in FIG. 6, the above tested is crack was easily detected by the spike in the infrared signal detected by the IR camera shown to the right of FIG. 6 and provided a clear pictorial view of the crack as seen on the left thereof.

The theory of this type of remote crack sensing using photothermal techniques is best described with reference to FIGS. 7-8. FIG. 7 shows a stationary surface with no defects heated as seen by the circular waves described. The heat propagation therein is sensed by an IR camera moving there along and shows the temperature profile as a smooth Gausian curve indicating a gradual temperature increase as you get closer to the laser heat source and then falling away as you pass it. FIG. 8 shows the same set-up but with a crack therein. It is seen that the temperature at the crack takes a steep drop since the crack acts as a barrier to the heat propagation in the heated surface causing a sudden drop in temperature sensed.

Referring now to FIGS. 1-3 it is seen that for testing the J-groove welds (20) with photothermal NDE, a heat line is generated that introduces a "stepchange" to the material surface. This step change results in a heat-wave that propagates through the surface. (As shown in FIGS. 7-8.) The image processing accentuates surface temperature change in the direction of the thermal wave propagation. The specific image processing scheme includes:

Applying the laser heat line near the right edge of the IR image and approximately transverse to the weld axis.

Capturing sequential images at a rate of 1 to 10 images per second for several seconds until the thermal wave has passed through the image area.

Applying a Sobel filter to enhance edges or changes in the temperature in the direction normal to the laser heat line (parallel to the thermal wave propagation direction and parallel to the weld) indicative of transverse weld cracks.

Repeating the above three steps for a laser line applied near the left edge of the IR image but still transverse to the weld axis.

The image can be further enhanced by subtracting the enhanced "left-side" image set from the "right-side" image set to cancel any geometry anomalies and accentuate the target flaw indications.

The process above is then repeated with laser lines parallel to the weld above and below the weld axis to detect cracks parallel to the weld axis.

The collection of one to two square inch areas can then digitally be grouped and combined to provide a representative image of the entire weld examination area.

From the foregoing it will be seen that the present weld crack examination technique offers the following benefits:

1. Detects flaws of interest
2. Characterizes length (well and depth to a limited degree)
3. Visual and understandable display
4. Rapid inspection (expect>2 to 3 nozzles/hour)

It will be understood that certain obvious details and modifications to the present invention have been deleted herein for the sake of conciseness and readability but that they are fully intended to fall within the scope of the folowing claims.

We claim:

1. A photothermal system for checking the integrity of J-groove welds in a nuclear reactor comprising:

a closure head of the reactor having a series of pipes extending there through into the reactor;

a circumferential weld around each of said series of pipes extending through said closure head;

a laser assembly located inside the reactor remotely from one of said circumferential welds for heating said weld;

an IR camera located inside the reactor remotely located from said one circumferential weld but able to view said weld; and movable means for moving said IR camera along said heated weld to sense the infrared temperature profile of said heated weld.

2. A photothermal system as set forth in claim 1 including a visual display of said infrared profile showing a continuous flat surface for a continuously increasing IR profile.

3. A photothermal system as set forth in claim 2 wherein a crack in said heated weld shows up as a sharp step in said temperature profile and as a crack in said surface visual display.

4. A photothermal system as set forth in claim 3 wherein a limited area of said circumferential weld is subjected to heat from said laser assembly followed by an IR scan of said limited area to detect cracks therein.

5. A photothermal system as set forth in claim 4 wherein said limited area is approximately 2 inches.

6. A photothermal system as set forth in claim 5 wherein said visual display uses a time-averaging method.

* * * * *